United States Patent
Guna et al.

(10) Patent No.: US 10,069,775 B2
(45) Date of Patent: Sep. 4, 2018

(54) SYSTEMS AND METHODS FOR DETECTING SPAM IN OUTBOUND TRANSACTIONAL EMAILS

(71) Applicant: Adobe Systems Incorporated, San Jose, CA (US)

(72) Inventors: Stefan-Valentin Guna, Bucharest (RO); Monica-Adriana Dagadita, Bucharest (RO)

(73) Assignee: Adobe Systems Incorporated, San Jose, CA (US)

( * ) Notice: Subject to any disclaimer, the term of this patent is extended or adjusted under 35 U.S.C. 154(b) by 357 days.

(21) Appl. No.: 14/153,211

(22) Filed: Jan. 13, 2014

(65) Prior Publication Data
US 2015/0200890 A1      Jul. 16, 2015

(51) Int. Cl.
*H04L 12/58*     (2006.01)

(52) U.S. Cl.
CPC .................. *H04L 51/12* (2013.01)

(58) Field of Classification Search
CPC ....... H04L 51/12; H04L 63/145; H04L 51/18; H04L 51/28; H04L 51/14; H04L 12/585; H04L 63/1483; H04L 63/14; G06Q 10/107; H04W 12/12
See application file for complete search history.

(56) References Cited

U.S. PATENT DOCUMENTS

| | | | | |
|---|---|---|---|---|
| 7,716,297 B1* | 5/2010 | Wittel | ..................... | H04L 51/12 709/206 |
| 7,899,866 B1* | 3/2011 | Buckingham | ........... | H04L 51/12 709/206 |
| 2003/0023875 A1* | 1/2003 | Hursey | ................ | G06Q 10/107 726/4 |
| 2004/0003283 A1* | 1/2004 | Goodman | ............ | G06Q 10/107 726/30 |
| 2005/0081059 A1* | 4/2005 | Bandini | ................ | H04L 12/585 726/4 |
| 2007/0006027 A1* | 1/2007 | Desouza | ................ | H04L 12/581 714/12 |
| 2013/0185051 A1* | 7/2013 | Buryak | ................. | G06F 17/248 704/2 |

* cited by examiner

*Primary Examiner* — Chris Parry
*Assistant Examiner* — Soe M Hlaing
(74) *Attorney, Agent, or Firm* — Kilpatrick Townsend & Stockton LLP

(57) ABSTRACT

Certain embodiments of the present disclosure provide methods and systems for detecting unsolicited messages (i.e., spam) and preventing unsolicited messages from being sent. Certain embodiments provide analyzing dynamic information received as part of a request to generate a message. Parts or elements of the dynamic information such as sender, recipient and content are analyzed using filters and configurable constants to determine an abuse score indicative of the likelihood that the dynamic information may generate spam if included in an electronic message. A course of action may be followed dependent on the abuse score determined. For example, if the dynamic information is deemed not likely to generate spam, an electronic message from the information received is generated and sent. Certain embodiments allow implementation of the system and method in a distributed environment comprising of multiple systems or servers performing the same method.

20 Claims, 6 Drawing Sheets

SYSTEMS AND METHODS FOR DETECTING SPAM IN OUTBOUND TRANSACTIONAL EMAILS

FIELD

This disclosure relates generally to systems and methods for a transactional messaging service that prevents the sending of unsolicited emails, commonly known as spam.

BACKGROUND

Electronic mail recipients are increasingly subjected to unsolicited mass mailings (spam). As automated approaches to sending spam began to emerge, software tools were written to counter the growing rate of spam, with the goal of saving companies huge amounts of bandwidth, server resources, and time spent on abuse management. The goal of many anti-spammer tools is to flag spam email. These anti-spammer tools facilitate the detection and classification of unsolicited emails (spam) in an incoming stream of e-mail messages. For example, some software anti-spam applications use heuristic filtering intended to identify specific characteristics of spam. Heuristic filtering may be used to flag incoming email as legitimate or spam. Other systems prevent spam by setting up filters based on statistical filtering which involves measuring probability. For example the tool POPFile uses Bayesian filtering based on word counts. Other tools, for example, TarProxy use existing filters to make decisions on how an email should be delivered.

As discussed above, existing systems tackle the issue of incoming spam. However, more and more applications are being configured to send or facilitate sending of automatic messages, triggered by user-generated events. Thus, a need arises for preventing abuse (i.e., spam) of an application or system that is configured to send information through automatic messages or notifications. For example, presently, many users use distributed computing (i.e., cloud computing) to share files such as documents or images. An application that administers the sharing of files using distributed computing allows a user to designate a file to be viewed or downloaded. A notification is usually sent to other users (i.e., via email) with information that the file is ready to be viewed or downloaded. This notification may be an automatic electronic message that is created and sent once the user-generated event of designating the file to be shared is completed. The creation and sending of the automatic message may be abused as it can be hijacked to disseminate spam. This is a problem because an application that is abused in this way may be blacklisted by mail service providers. Thus if blacklisted, any emails sent by that application are blocked, preventing legitimate emails from the application from reaching the intended recipients. Worse yet, all applications hosted within a certain domain (which could be all or significant applications administered by a company) may be blacklisted by a mail service if spam is detected as originating from within that domain, thus hindering the normal operations of that company.

SUMMARY

Certain embodiments provide a method for preventing outgoing spam in systems that automatically generate electronic messages in response to user-generated events. A message controller receives a request from an application to send an electronic message. The request may identify or include static information (i.e., system-generated information) and dynamic information (i.e., user-generated information) used to specify the format and content of the electronic message. The dynamic information is analyzed and an abuse score is calculated to indicate the likelihood that a message including the dynamic information would be spam. If the abuse score is less than an abuse score threshold, the message controller generates the requested electronic message, which may then be sent to the intended recipient(s) via an email service provider. If the abuse score is greater than or equal to the abuse score threshold, the request is rejected and no message is generated.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, aspects, and advantages of the present disclosure are better understood when the following Detailed Description with reference to the accompanying drawings, wherein.

DETAILED DESCRIPTION

Figure 1:
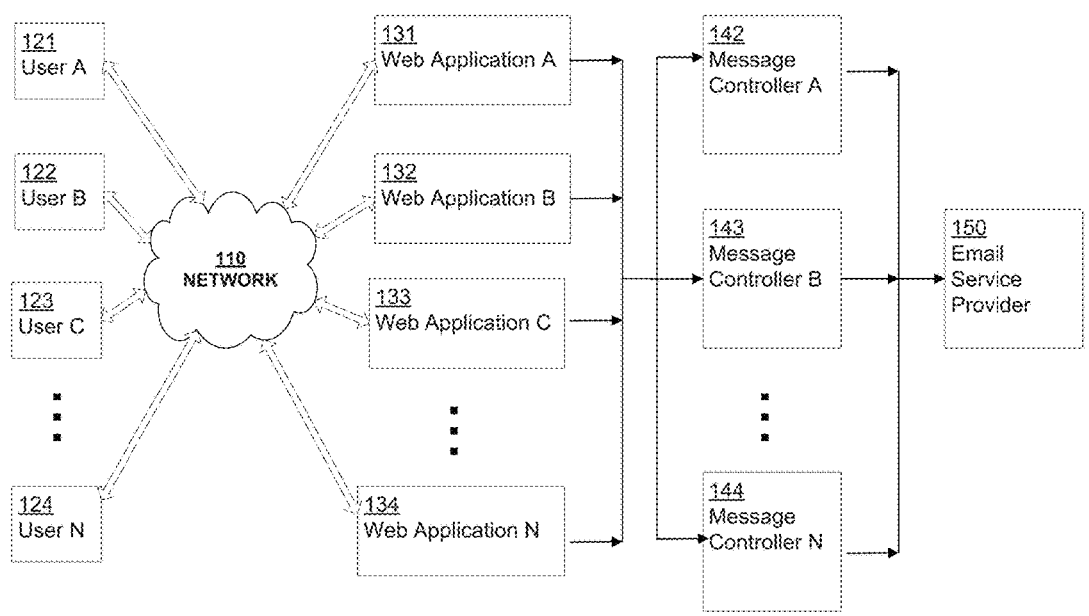
FIG. 1 is a block diagram depicting exemplary computing devices in an exemplary computing environment for implementing certain embodiments.

Computer-implemented systems and methods are disclosed for preventing outgoing spam email. An application or system may be configured to automatically generate a notification in response to a user-initiated event. The notification may be sent as an electronic message, and thus, a need arises for preventing abuse of the system or application, i.e., use of the application or system to generate spam. A message controller included in such a system or application can be configured for use in preventing the sending of spam messages by verifying that content or information to be included an electronic message is legitimate, meaning that an electronic message including the information is not likely to be spam.

In one embodiment, a message controller receives a request through an API to send a notification as an electronic message. The request may include or identify, but is not limited to, a format for the electronic message and content to be included in the electronic message. The content to be included in the electronic message may include dynamic information, i.e., information which may be wholly or in part specified by the user and thus presents an opportunity for abuse. Dynamic information may include, but is not limited to, an identification of the recipient of the message, the sender's device address, and a user-message, etc.

The message controller uses filters on the dynamic information to determine the likelihood that dynamic information as a whole would generate spam if included in an electronic message. To accomplish this, multiple score values associated with parts of the dynamic information are calculated using filters that enforce any combination of guidelines that flag user-generated spam. From the multiple score values an abuse score is calculated for the dynamic information as a whole. A configurable course of action may be specified dependent upon the abuse score calculated for the dynamic information. For example, in the event of a negative result of a comparison of the abuse score with a configurable threshold (e.g., if the abuse score is greater than the threshold), the electronic message would not be generated and a notification may be provided to the web application with any information pertinent regarding not generating the electronic message such as the abuse score. On the other hand, in the event of a positive result of the comparison of the abuse score with the configurable threshold (e.g., if the abuse score is less than or equal to the threshold), the electronic message is generated and sent using an email service provider. Additionally, a history of electronic messages may be kept by the message controller for tracking all messages handled, whether sent or rejected.

As used herein, the term "spam" refers to unsolicited electronic messages. These messages may be sent on the Internet to a large number of recipients generally considered as junk email.

As used herein, the term "ham" refers to non-spam electronic messages. Ham is legitimate electronic messages.

As used herein, the term "web application" refers to a web application that uses a web browser as a client and is configured to send information through automatic messages or notifications. A non-limiting example of a web application is SendNow® from Adobe®.

As used herein, a "template" refers to a tool such as a file that serves as a starting point for an electronic message. A template is used for enforcing a standard layout and look of an electronic message by providing a pattern used as a guide. A template may contain layout areas that may be edited and some that may not be edited.

As used herein, a "user-initiated event" is any action performed by a user on a web application that causes a notification to be sent to a recipient. A non-limiting example of a user-initiated event is when a user uses SendNow® from Adobe® to request that a large file be provided for download by specified recipients.

As used herein, a "notification" is any message that is to be sent to a recipient. Notifications may be sent, though not exclusively, by email or by a blog comment, etc.

These illustrative examples are given to introduce the reader to the general subject matter discussed here and are not intended to limit the scope of the disclosed concepts. The following sections describe various embodiments and examples with reference to the drawings in which like numerals indicate like elements.

FIG. 1 is a block diagram depicting exemplary computing devices in an exemplary computing environment for implementing certain embodiments. In the illustrated example, User A through User N (121-124) accesses any one of Web Application A through Web Application N (131-134) through network 110. There may be any number of users and any number of web applications. Web Application A through Web Application N (131-134) may be any application that generates notification. Notifications may be generated based on a user-initiated event. A user-initiated event may occur as a user interacts through a web browser with a web application. For example, a user may make a purchase using a web application. Once the user completes the purchase, the web application may automatically send a notification. A notification may be sent as an email message. In this example, the notification may be an electronic message containing the invoice or purchase confirmation that is sent using any email service provider.

Examples of such applications include but are not limited to applications that allow users to share files or images such as SendNow® from Adobe®. For example, if User A 121 wants to share a document using SendNow®, User A 121 may access SendNow® as Web Application A 131 through network 110. Web Application A 131 prompts User A for information regarding the document to be shared. The information can include but is not limited to the document and names of recipients who will have access to the document along with their email addresses. Additionally, Web Application A 131 may prompt User A 121 for an optional message to include in a notification to all recipients. Once User A 121 completes this task, Web Application A 131 sends a request to one of Message Controller A through Message Controller N (142-144) to send the notification. In some configurations, the message controller that receives the request is selected at random by a dispatcher (not shown) that load-balances the requests among all available message controllers.

Before the notification from Web Application A 131 is sent as an electronic message by any email service provider 150, the content that is used to generate the electronic message should be verified to not generate spam. Some of the content used to generate the electronic message may vary and is user-specified and thus is dynamic information. For example, dynamic information may include, but is not limited to the recipient of the message, the sender's device address, and a user-message. The recipient of the message may be specified as an email address. The device's address may be specified as its Internet Protocol (IP) address. The user-message is any additional content that is specified by User A 121 and is usually included in the body of the electronic message. Note that dynamic information may be specified by the Web Application 131 and/or User A 121. In some contexts, User A 121 of Web Application 131 could be considered the sender and/or recipient of the notification (in the sense that the user-initiated event triggers the sending of a notification, which may be delivered to the user).

The dynamic information may be defined in part by Web Application A 131 and in part by User A 121. However, usually User A 121, alone, would define a user-message. An example of user-message may be a description of a purchase made or a description that the purchase was a gift for a friend. All other content besides the user-message may be set, in part, by Web Application A 131, and in part, by User A 121. Which subset of the dynamic information is set by the Web Application A 131 and which is set by User A 121 may be unknown. Whenever a user such as User A 121 is free to specify dynamic information to be incorporated into an electronic message, there is an opportunity for abuse. Spam generated by Web Application 131 because of dynamic information specified by User A 121 is user-generated spam. Therefore, given that User A 121 can potentially specify anything in the dynamic information and given that the dynamic information is included in the electronic message, the dynamic information should be verified to confirm that it is not user-generated spam.

Note, that although the request to send the notification is from Web Application A 131 and possibly the electronic message sent will have the name of Web Application A 131 in the "From" field of the electronic message, User A 121 may be considered the sender of the notification and/or the electronic message, since User A performed the user-initiated event of designating the file to be shared. User A 121 may also be a recipient of the electronic message in some cases.

Web Application A 131 may make the request to send the notification through an API provided by, for example, Message Controller A 142. In this example, Web Application A 131 is a client of Message Controller A 142. The request from Web Application A 131 to Message Controller A 142 to send the notification may include message information comprising a template and dynamic information. The template defines the format of the electronic message to be generated. The template may be the template itself or an identifier such as a name or link to access the template. The dynamic information can include but is not limited to administrative content and a user-message. The dynamic information may be specified by User A 121 and/or Web Application A 131. The administrative content of the dynamic information may include the first name and/or last name of the sender, the recipients' names and/or email addresses, the location of the shared document which may be specified as a URL, etc. The user-message part of the dynamic information may be any information the user specifies to be included in the body of the electronic message.

Once Message Controller A 142 receives the request, it analyzes the dynamic information to determine the likelihood that it may generate spam if included in a message. If the dynamic information is determined legitimate an electronic message is generated using the template and the dynamic information and the electronic message is sent to any email service provider 150. If the dynamic information is deemed to likely generate spam, the electronic message is not generated and the request is rejected by Message Controller A 142, Message Controller A 142 may send a notification to Web Application A 131 specifying that the electronic message was not sent. It is to be understood that the functionality of all of the Web Applications 131-134 and Message Controllers 142-144 is assumed to be substantially similar for purposes of the present example.

Figure 2:
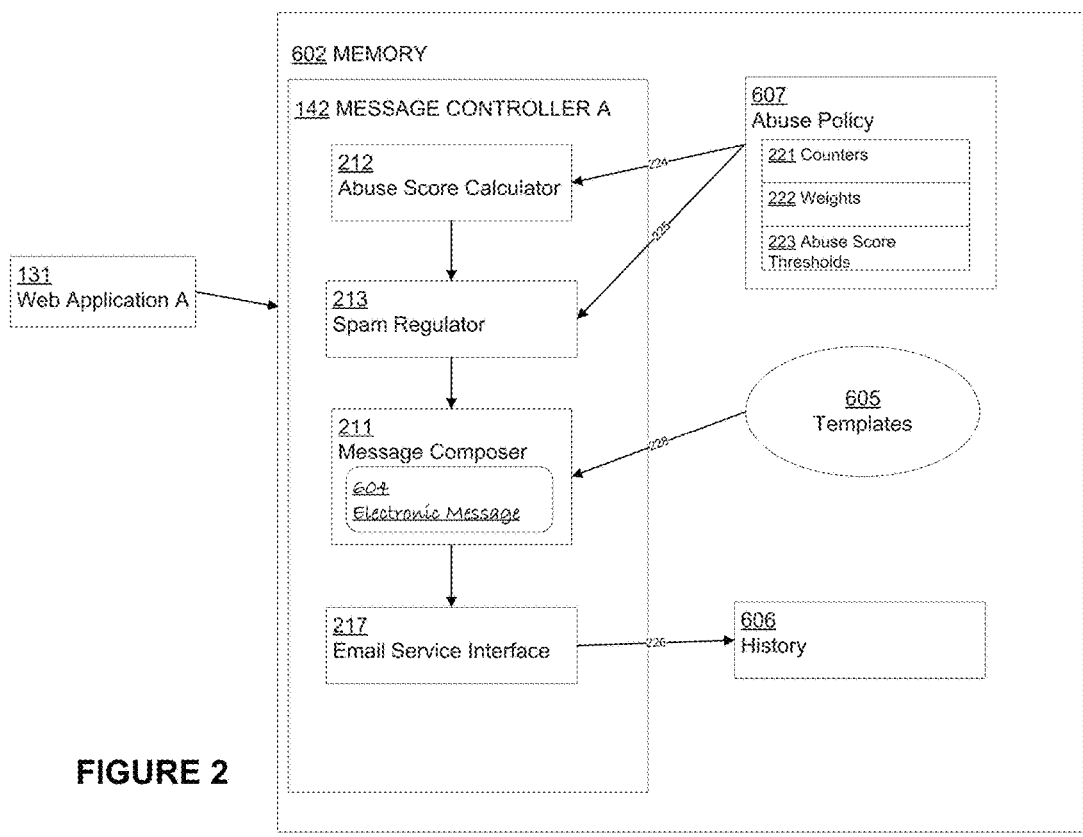
FIG. 2 is a system diagram illustrating an exemplary message controller.
Figure 6:
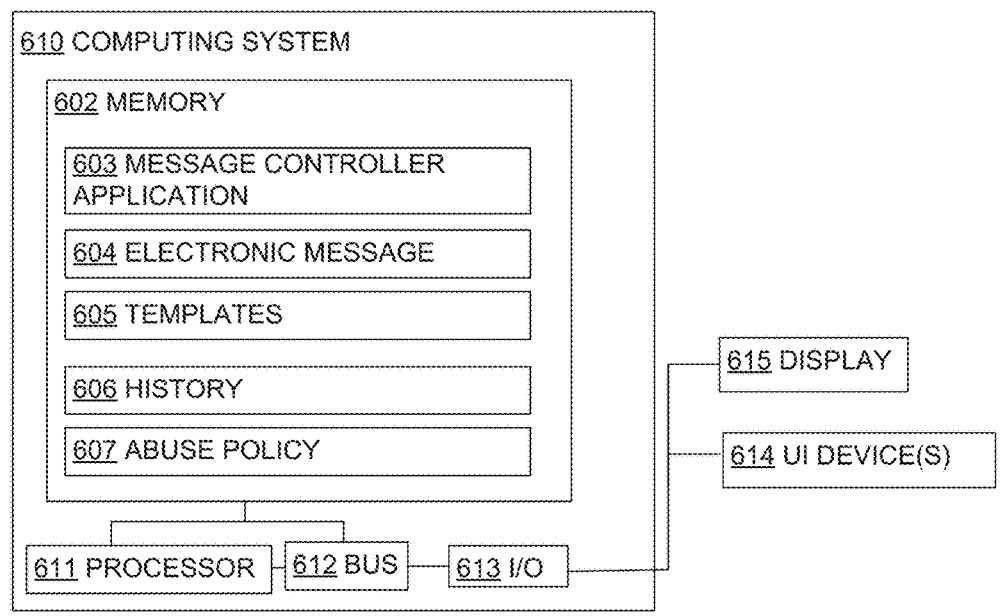
FIG. 6 is a block diagram depicting an example computing system for implementing certain embodiments.

FIG. 2 is a system diagram showing an example of Message Controller A 142 that is configured to implement message controller application 603 shown in FIG. 6. As discussed above and now shown in FIG. 2, Web Application 131 sends a request to Message Controller A 142 to send a notification. The request can include message information comprising a template (or identification of a template) and dynamic information.

Message Controller A 142 aims at mitigating user-generated spam through the use of filters that can reject a client's request to send an electronic message that is likely to be user-generated spam. For example, Message Controller A 142 may use filters that would enforce the following and/or other abuse-prevention guidelines:
  limit on the number of electronic messages a particular user may cause to be sent on a daily basis;
  monitor peaks in the outbound electronic message rate from a user;
  limit the number of electronic messages sent to the same recipient on a daily basis;
  monitor peaks in the outbound electronic message rate targeting a single recipient;
  filter analysis, such as a Bayesian filter, on the dynamic information, wholly or in part;
  block electronic messages that originate from an IP address that is blacklisted or included in known spam public directories; or
  block electronic messages that include links to known phishing sites, or prevent such links from being inserted in emails.

As an example, in some embodiments, an abuse score calculator 212 may receive the request and analyze the dynamic information to determine if it is legitimate or likely to generate spam. The dynamic information comprises administrative content and a user-message.

Message Controller A 142 may use one filter or any combination of filters that enforce guidelines to prevent user-generated spam. The filter(s) may be used to determine the likelihood that dynamic information would generate spam if included in an electronic message. To accomplish this, multiple score values associated with parts of the dynamic information may be calculated using filter(s) that enforce any combination of the guidelines that flag user-generated spam. From the multiple score values an abuse score may be calculated for the dynamic information as a whole. A configurable course of action may be specified dependent upon the abuse score calculated for the dynamic information. For example, if the abuse score is greater than a configurable threshold, the electronic message would not be generated and a notification may be provided to the client with any information pertinent regarding not generating the electronic message such as the abuse score. If the abuse score is less than or equal to a configurable threshold, the electronic message is generated and sent using an email service provider. Additionally, a history of electronic messages may kept by the message controller for tracking all messages handled, whether sent or rejected.

Figure 3:
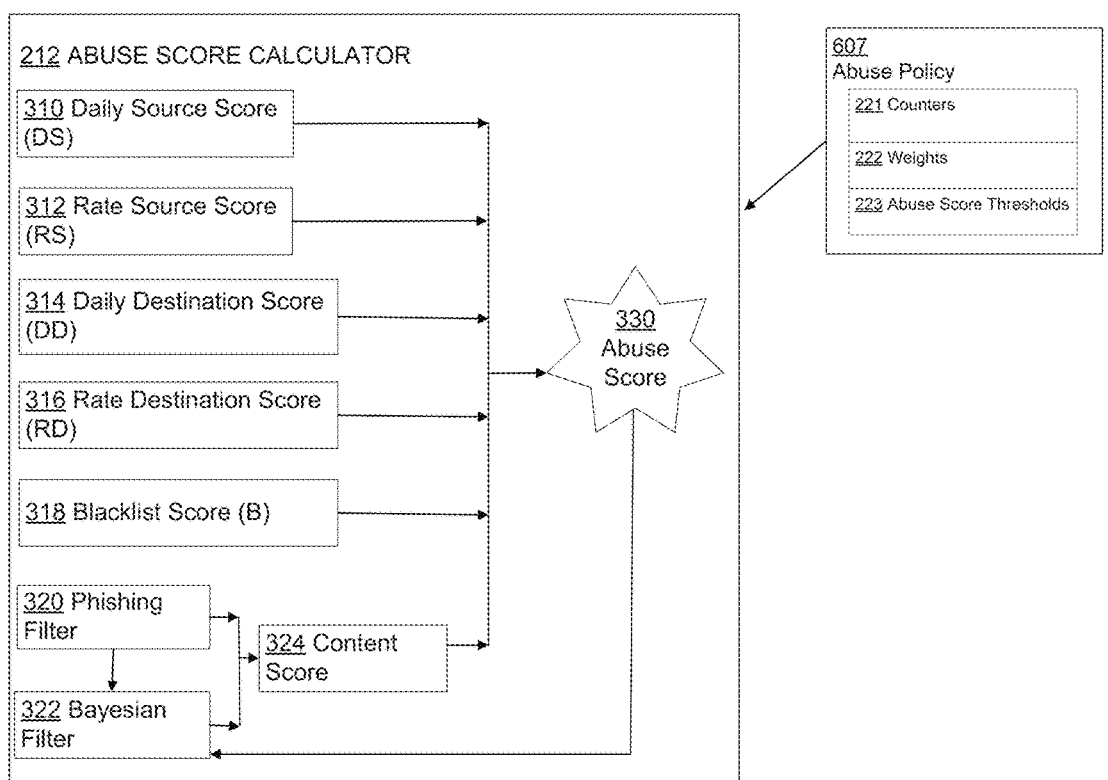
FIG. 3 is a diagram illustrating an exemplary abuse score calculator.

FIG. 3 shows an example of abuse score calculator 212 and the various scores that may be used in computing an abuse score 330 for the dynamic information. Abuse score calculator 212 accesses the dynamic information received to determine an abuse score 330. The abuse score 330 is a measure of the likelihood that the dynamic information would generate spam if included in a message that is sent. The abuse score is computed by taking into account factors that are indicative of a spam message. Factors include but are not limited to the number of messages from a single user, the number of messages to a single recipient, the probability that the dynamic information is spam, whether the user's IP address is blacklisted in public directories, and if a link included in the message is a link to a phishing site.

To determine an abuse score, each part of the dynamic information is analyzed to determine individual scores or multiple score values. As discussed previously, the dynamic information comprises administrative content and a user-message. Administrative content further comprise, for example, recipient's email address or the sender's IP address. The administrative content (i.e., recipient's email address and sender's IP address) and the user-message are analyzed through filters to determine individual scores. The individual scores may then be added to compute an abuse score.

With reference to FIG. 3, an example of how the abuse score 330, here designated as 'A', may be computed is as follows:

$$A \triangleq \Sigma_{x \in (DS, RS, DD, RD, C, B)} X \times w_x$$

$$A \triangleq x \in DS, RS, DD, RD, C, B X \times w x$$

'DS' is the daily source score 310, 'RS' is rate source score 312, 'DD' is the daily destination score 314, 'RD' is the rate destination score 316, 'C' is a content score 324 and 'B' is a blacklist score 318. All these scores measure different aspects of the dynamic information. The variable $w_x$ takes into account the weight given to score x. This allows the weight given to each score to be a configurable value. The weight given to a score may be set by Message Controller A 142 or by the web application making the request. Referring to FIGS. 2 and 3, these weights 222 can be constants kept as part of the abuse policy 607 for Message Controller A 142. The abuse policy 607 comprises counters 221 used to compute the score values. Additionally abuse policy 607 further comprises abuse score thresholds 223 used to determine whether dynamic information is spam or legitimate. An explanation of each of the score values follows.

Daily Source Score (DS)

DS, the daily source score 310 indicates if the number of emails a user sends in a day has reached a maximum allowed. This score reflects the number of electronic messages generated by or for a user as a designated sender. As discussed previously, the designated sender is the user that initiates the sending of a notification by performing a user-defined event, such as sharing a document, etc. DS may be computed by the abuse score calculator 212 by counting the number of electronic messages from the designated sender (i.e, user) that are sent in a day, $SENT_{day}$, which may be kept as a day-sent counter for the sender and dividing it by the number of electronic messages allowed for a designated sender in a day, $ALLOW_{day}$. The number of electronic messages allowed for a designated sender in a day may be a constant specified by the web application making the notification request or by the message controller processing the electronic message. Therefore, DS may be calculated as follows:

$$DS \triangleq (SENT_{day(sender)}/ALLOW_{day(sender)}, 1)$$

Therefore, if the $SENT_{day(sender)}/ALLOW_{day(sender)}$ calculation returns a value less than one, DS is set to that value, otherwise DS is set to 1. When DS is 1, it indicates that the maximum number of messages from a user (as the sender) have been sent on a particular day. Thus, the value of DS=1 is the highest possible value of DS and when it is used to calculate the abuse score 'A', it would increase the abuse score respectively.

For example, if part of the dynamic information received includes a template variable designating the sender, such as the IP address of the sender's device or the name of the sender, this template variable designating the sender's device or the sender would be used to tally the counters used to calculate DS. Therefore, from the dynamic information designating a sender, DS, one of the multiple score values, is calculated.

Rate Source Score (RS)

Rate source score, RS 312, can be used to prevent high peaks in the number of electronic messages that are sent by a designated sender. Like the daily source score, DS, this score is also associated with the number of electronic messages for a designated sender and indicates the rate at which messages generated for a user (as the designated sender) are sent in a day. This score is computed by comparing the number of electronic messages sent by a designated sender in a one minute moving window, $SENT_{minute(sender)}$, which may be kept as a minute-sent counter for the sender, against the average number of mails sent by the same designated sender per minute, AVG, which may be kept in an average counter multiplied by the number of electronic messages allowed to be sent by the same designated sender per minute, $ALLOW_{minute(sender)}$, which may be a constant. Therefore RS may be computed as follows:

$$RS \triangleq (SENT_{minute(sender)}/AVG \times ALLOW_{minute(sender)}, 1)$$

Like calculating DS, if the $SENT_{minute(sender)}/ALLOW_{minute(sender)}$ calculation returns a value less than one, RS is set to that value, otherwise RS is set to 1. When RS is 1, it indicates that the rate of messages sent per minute where the user is the sender has reached a maximum allowed. Thus, the value of RS=1 is the highest possible value and when it is used to calculate the abuse score 'A', it would increase the abuse score respectively.

The rate source score (RS) like the daily source score (DS) is calculated from the dynamic information that designates a sender. This for example may be the sender's device IP address or the name of the sender.

Daily Destination Score (DD) and Rate Destination Score (RD),

DD is the daily destination score 314 and RD is the rate destination score 316. These scores are associated with the number of electronic messages that a recipient receives instead of the number of electronic messages sent by or for a designated sender. Therefore, these scores are counterpart to the daily source score (DS) and rate source score (RS), respectively. The daily destination score (DD) is computed the same as the daily source score (DS) and the rate destination score (RD) is computed the same as the rate source score (RS), except that rather than counting and limiting the number of electronic messages sent by a designated sender, these scores count and limit the number of electronic messages that are associated with a specific recipient. Note that the $SENT_{day(recipient)}$ value may be kept as a day-sent counter for the recipient and the $SENT_{minute(recipient)}$ value may be kept as a minute-sent counter for the recipient. The daily destination score (DD) and the rate destination score (RD) may be calculated as follows:

$$DD \triangleq (SENT_{day(recipient)}/ALLOW_{day(recipient)}, 1)$$

$$RD \triangleq (SENT_{minute(recipient)}/AVG \times ALLOW_{minute(recipient)}, 1)$$

To calculate DD and RD, part of the dynamic information that specifies a recipient is used. For example, if part of the dynamic information received includes a template variable designating the recipient, such as the recipient's email, this template variable designating the recipient would be used to tally the counters used to calculate DD and RD. Therefore, from the dynamic information designating a recipient, DD and RD is calculated.

Blacklist Score (B)

The blacklist score, B, 318 designates whether the designated sender's IP address has been listed in a public directory of known spammers, such as the directory maintained by SpamCop. If the IP address is found in such a directory, the blacklist score B is set to 1; otherwise, B can be set to 0.

For example, to calculate this score, the part of the dynamic information that specifies the sender's IP address is used. The IP address may be checked against, for example, SmapCop to determine if it is blacklisted.

Content Score (C)

The content score, C, 324 is a measure of the probability that the user-message is considered spam. Abuse score calculator 212 calculates a content score using the user-message.

Various filters may be used to compute the content score 324. For example, a phishing filter 320 may be used to determine if the user-message contains links to known phishing sites. In some embodiments, this may be accomplished by using a repository containing links to know phishing sites such as PhishTank which is openly available via a web service API. If a link is found to a phishing site, the content score, C, may be set to 1.

If no links are found to a phishing site, the user-message would be analyzed using a Bayesian filter 322. A Bayesian filter outputs the probability that the user-message is likely spam. This probability would be assigned to the content score 324.

An example of implementing a Bayesian filter to compute the content score for the user-message is started with p(w), the probability that a randomly chosen email containing word w is spam. The probability p(w) can be derived from two ratios b(w), the ratio of spam email containing word w out of the total number of electronic messages that are spam and g(w), the ratio of legitimate (ham) emails containing w out of the total number of legitimate emails. Then p(w) may be computed as follows:

$$p(w) = \frac{b(w)}{b(w) + g(w)}$$

However, some words appear more frequently in emails than others; therefore, some weight may need to be given to these words when computing p(w). A new measure f(w) may be computed that combines information of the background of a word w with its probability p(w). It may be computed as follows:

$$f(w) = \frac{s \cdot P_0 + n(w) \cdot p(w)}{s + n(w)}$$

In the above equation, 's' is the strength given to background information for a word w. '$P_0$' is the default probability that an infrequent word is irrelevant. The total number of emails that contain the word w is n(w). A message controller may set s=3 and $P_0$ to 0.5 which allows a new word to be unbiased as long as it has not been included in at least three emails.

Statistical tools such as Fisher-Robinson's inverse chi-square method may be used to combine f(w) of all words w included in the user-message.

As shown in FIG. 3, the daily source score 310, rate source score 312, daily destination score 314, rate destinations score 316, blacklist score 318, and content score 324 can all be used to compute abuse score 330 in some embodiments. In other embodiments other types of scores or factors may additionally and/or alternatively be used to compute the abuse score 330.

To compute some of the scores described above, counters are needed. For instance, for each designated sender (i.e. each user) and each recipient of an electronic message, message controller A 142 may manage counters such as day-sent counter, minute-sent counter, average counter for each recipient and each sender. For example, these may include $SENT_{day\ (sender)}$ and $SENT_{day\ (recipient)}$ day-sent counters, which are the total number of emails sent by a user or sent to a recipient in a day. These counters are reset daily and may be used to compute the daily source score (DS) and the daily destination score (DD). Additionally, these counters along with a timestamp denoting when the first email for a particular user was first sent by Message Controller A 241 can be used to compute AVG. Other counters are needed to compute $SENT_{minute(sender)}$ and $SENT_{minute(recipient)}$ minute-sent counters, which are reset every minute and used to compute rate source score 312 and rate destination score 316. The Bayesian filter additionally needs to keep counters regarding the number of times a word has appeared in a spam email or a legitimate email.

It is known in the art that Bayesian filters work best when they are trained and have the required samples to compute the ratios b(w) and g(w). Learning may be performed by manually inputting information indicating when an email is spam. This approach may work for a limited number of mails; however, as the number of emails increases, learning should be automatic. An automatic learning method that may be implemented is "train-on-error." New words are classified as spam or ham (legitimate) depending on the abuse score 330 computed for the dynamic information. This method allows the content of emails encountered during a period when many spam messages are generated to affect the ratios taken into account by the Bayesian filter. Therefore, as depicted in FIG. 3, the abuse score 330 is reported to the Bayesian filter 322 for better tracking of words that are classified as spam or ham.

As shown in FIGS. 2-3, these counters 221 may be implemented as part of abuse policy 607. An abuse policy 607 may be kept by each message controller 142-144 to keep track of counters 221 as described above. The abuse policy 607 may also include configurable constants such as weights 222 that are used for computing the abuse score 330 of each electronic message. Also abuse score thresholds 223, may be part of abuse policy 607, which are used to determine if dynamic information is spam or legitimate. The abuse score thresholds are used by spam regulator 213 as described below.

Referring back to FIGS. 2-3, once an abuse score 330 is calculated by abuse score calculator 212 for the dynamic information received, spam regulator 213 compares the abuse score 330 to an abuse score threshold 223. There may be different abuse score thresholds 223 for each client of message controller A 142. Hence abuse score thresholds 223 may be kept as part of abuse policy 607.

A course of action defining what actions to take dependent on a comparison of the abuse score 330 and an abuse score threshold 223 may be specified or configurable by spam regulator 213. For example, if the abuse score 330 is less than the abuse score threshold 223, the spam regulator 213 may specify that the template received (or the template accessed by the template identifier) is to be rendered with the dynamic information analyzed. If so, message composer 211 renders the template received using the dynamic information analyzed to generate electronic message 604. This is explained further using FIGS. 4A and 4B. If the abuse score 330 is greater than or equal to the abuse score threshold 223, the dynamic information received is likely spam and the spam regulator 213 may specify that a notification be sent to web application A 131 specifying a reason why the notification was not sent. This notification back to web application A 131 may be done by spam regulator 213 or email service interface 217.

Once message composer 211 generates electronic message 604, the electronic message 604 is provided by the email service interface 217 to an email service provider 150 for sending. In addition to providing the electronic message 604 to email service provider 150 or notifying web application A 131 that electronic message 604 was not sent, email service interface 217 may additionally keep track of all electronic messages processed by updating history 606 of the Message Controller A 142.

Message Controller A 142 may have access to only one abuse score threshold 223. That is, all abuse scores 330 calculated are compared to the same abuse score threshold 223 regardless of the client making the notification request. Alternatively, message controller A 142 may have access to multiple abuse score thresholds 223 depending on the client that requested the notification to be sent. Having multiple abuse score thresholds 223 allows a different threshold to be used for each Web Application (client) 131-134. Abuse score thresholds 223 may be set either by the Web Application 131-134 using the API to the Message Controller 142-144 or by the Message Controller 142-144 upon initialization.

In embodiments where there is only one message controller 142, the maintenance of the counters 221 may be solely performed by the message controller 142. However, as shown in FIG. 1, in an embodiment that is distributed with more than one message controller 142, the maintenance of counters 221 is more complicated because a request for a notification to be sent may be routed to any one of the Message Controllers A through N, 142-144. Hence, a first message from user A 121 may be handled by message controller A 142 and a second message from user A 121 may be handled by message controller B 143. Hence all counters associated with user A 121 must be updated and synchronized by Message Controller A 142 through Message Controller N 144.

In a distributed environment, local counters 221 of each Message Controller 142-144 may be synchronized using a broadcast scheme where each message controller sends a notification to all other message controllers for every request received. That is, each time message controller A 142 receives a request, a broadcast message is sent to Message Controller B 143 through Message Controller N 244 with information necessary for updating each of their local counters such as, for example, $SENT_{day\ (sender)}$ and $SENT_{day\ (recipient)}$ counters.

In another example, counters 221 may be synchronized periodically, for example, every thirty seconds, Every thirty seconds, each message controller broadcasts partial increments of each counter. Partial increments may include only increments that have occurred since the last periodic broadcast. This implementation would decrease the number of broadcast messages.

In yet other embodiments, a server could maintain a counters database. Periodically, each message controller 142-144 may send a notification to the server with updates to its local counters 221. The server would update the counters database each time a notification is received. The server maintaining the counters database would periodically broadcast the updated counters 221 from its counters database to all Message Controllers A-N 142-144.

To improve performance, some of the counters 221 may be kept in cache memory of computing system 610 (shown in FIG. 6). Because of this and to comply with privacy regulations protecting end-users, stale counters 221 must be erased periodically in some embodiments. For example, the counters 221 keeping track of daily interactions or interactions by the minute may be reset every day or every minute, respectively. In addition, the average email send rate AVG tends to go to 0 for users or recipients which are infrequently denoted as the sender or recipient of electronic message processed by message controllers. Hence, for these infrequent users or recipients, the AVG part of the score calculations may be pruned out since AVG would be set to 0 and this value is used as the denominator in the calculation of RD and RS.

As an example, in some embodiments, once the dynamic information is determined legitimate (i.e., not likely to generate spam when included in a message) the message composer 211 accesses the template specified in the message information from the templates 605 which may be a database of templates stored in the memory 602 or otherwise accessible by the message controller application 603 (shown in FIG. 6). Templates may be uniquely identified by a namespace comprising a name and locale. Various templates may be stored in a set of available templates 605. Templates provide format and static content used to generate the electronic message. For example, there may be a template for generating a message to notify recipients that a user has designated a file tier sharing. Another template may provide the format and static content for an electronic message to confirm purchase of an item or to confirm that a user profile has been created.

Message composer 211 accesses the template specified in the message information from the templates 605, at 228. Message composer 211 generates electronic message 604 using the template and the dynamic information contained in the message information. An example of using a template and dynamic information to generate an electronic message is described below with reference to FIGS. 4A and 4B.

Figure 4A:
FIG. 4A is a template depicting example format for an electronic message.
Figure 4B:
FIG. 4B is an example of an electronic message generated using the template of FIG. 4A.

FIG. 4A shows an example of a template 401 (e.g., which may be stored in the set of available templates 605) which is used to generate the exemplary electronic message 604 shown in FIG. 4B with dynamic information specifying administrative content and a user-message. As shown in FIG. 4A, template 401 comprises static sections and template variables. When generating an electronic message using a template and dynamic information, the static sections in the template are not changed and remain as specified in the template. In contrast, template variables in the template are replaced by the administrative content included as part of the dynamic information. For example, in FIG. 4A, static sections include any text that is not preceded by "$!" and variables are defined by "$!{variable_name}". In the template shown in FIG. 4A, the "From:", "Reply-To:", "Error-To:" and "Charset" lines shown at 440 are all static sections. The "Subject" line at 440 contains both a static section, "sent you a file through Adobe Creative Cloud" and template variables "$!{First_Name}" and "$!({!Last_Name}". These template variables correspond to the first name and last name of the sender which are included in the administrative content of the dynamic information received. In the body of the template, line 420 contains both a static section "sent you a file through Adobe Creative Cloud" and variables "$!{First_Name}" and "$!{Last_Name}" corresponding to the first name and last name of the sender. Lines 421 and 422 contain variables "$!{User_Message_html}" and "$!{Link_URL}". The "$!{User_Message_html}" variable corresponds to the user-message. The "$!{Link_URL}" corresponds to the location of the shared document. Lines 411 and the lines in 412 are all static sections.

To generate the electronic message 402, message composer 211 replaces template variables with corresponding dynamic information and keeps static sections of the template unchanged. As shown in FIG. 4B, showing electronic message 604 which was generated using template 4A, the recipient's email address, "Jane.Morrison@adobetest.com" which was received as part of the administrative content is shown in the "To" line at 470. In line 450, the sender's first name and last name which are part of the administrative content and set to "Jane" "Morrison", respectively replaced variables "$!{First_Name}" and "$!{Last_Name}" Line 441 shows the user-message, "This is the message introduced by the sender. Potential candidate for abuse" that replaced variable "$!{User_Message_html}." Line 442 is the static section 411 from the template in FIG. 4A that remained unchanged. Line 443 shows the location of the document to be shared that replaced template variable "$!{Link_URL}." The lines at 460 at the bottom of the email all remain unchanged from static section 412 of the template. Accordingly, once all template variables in the template are replaced by the dynamic information, the electronic message is complete and ready to be sent.

Referring back to FIG. 2, once the electronic message 604 is generated by the electronic message composer 211, it is provided to the email service interface 217 to send using email service provider 150.

Figure 5:
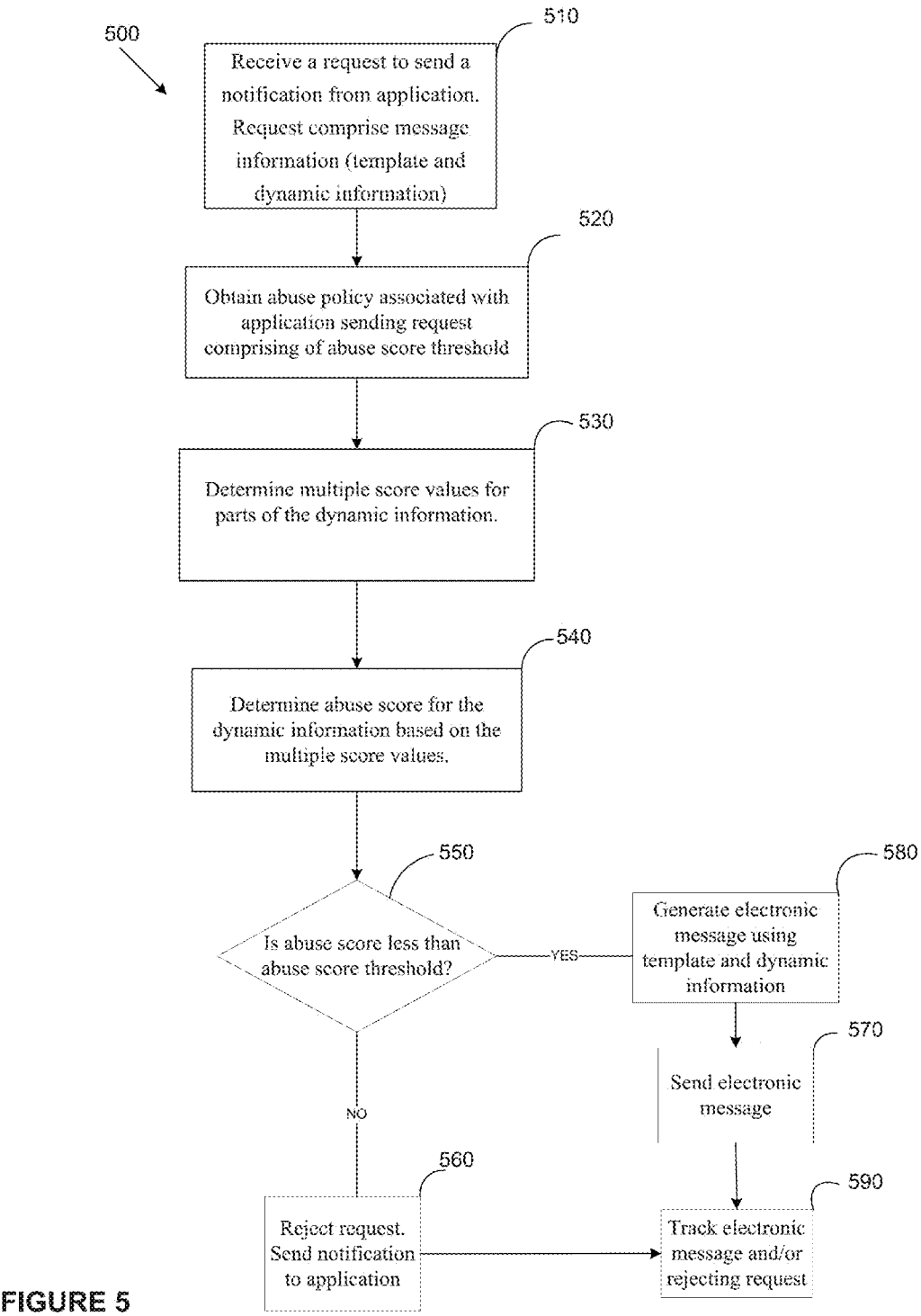
FIG. 5 is a flow chart illustrating an example method determining whether an electronic message is legitimate or spam.

FIG. 5 illustrates an exemplary method 500 of analyzing dynamic information for spam before an electronic message is generated. If the dynamic information is legitimate, an outgoing electronic message is generated which includes the dynamic information. This exemplary method 500 comprises receiving a request to send a notification from an application such as a web application, as shown in block 510 of FIG. 5. Such request comprises message information which specifies a template and dynamic information. A template defines the format of the message and the dynamic information is included in the notification (i.e., electronic message) generated according to the format of the template. For example, the dynamic information of an email can include but is not limited to information containing the first name and/or last name of the sender and/or recipient, the subject of the email, the to/from addresses, user-message (i.e., a description of the user-initiated event), etc. This dynamic information may be specified by the user as well as the application.

At block 520, an abuse policy is obtained. The abuse policy comprises thresholds that may be used to determine whether dynamic information would likely generate spam if included in an electronic message. The abuse policy further comprises of counters that aid in determining multiple score values indicative of whether dynamic information would likely generate spam. Additionally, an abuse policy may also include weights that may be given to any one of the multiple score values determined. The thresholds and weights may be configurable constants that may be specific to an application.

The method 500 further comprises determining multiple score values for the dynamic information at block 530. The score values are associated with factors that are indicative of whether dynamic information is spam. The score values may be associated with at least one of the sender, the recipient, and the user-message of the electronic message, including any other factor that is indicative of spam. Therefore score values may be calculated for each part of the dynamic information received. For example, a score value that indicates or limits the number of messages from a single user that are sent in a day or a minute may be calculated using the dynamic information that specifies the sender. A score value indicative of the number of messages to a single recipient may be calculated using the recipient information included in the dynamic information. A score value indicative if an IP address is blacklisted may be calculated using the IP address included in the dynamic information. A score value indicative if the user-message is likely spam would be calculated using the user-message in the dynamic information. Examples of multiple score values calculated using parts of the dynamic information include but are not limited to a daily source score, a rate source score, a daily destination score, a rate destination score, a content score and a blacklist score.

Counters which may be included as part of an abuse policy may be used to determine the multiple score values at block 530. Counters may be used to keep track of the number of messages sent or received by a particular user or recipient within a predetermined time period. At block 540, the abuse score may be computed using the multiple score values calculated at block 530 from the dynamic information. Additionally, the weights which may be included as part of the abuse policy may be used when calculating the abuse score to indicate different weights that may be given to the multiple score values calculated at block 530.

The abuse score is compared to the abuse score threshold at block 550. In the event that the abuse score is less than the abuse score threshold, the dynamic information is used along with the template to generate an electronic message at block 580. The dynamic information is inserted at corresponding sections of the template in accordance to the format of the template. The template may include static sections and template variables. The static sections remain as is in the generated electronic message. The template variables are substituted with the administrative content and user-message that was provided as part of the dynamic information.

In the event that the abuse score is more than or equal to the abuse score threshold, no message is generated and the application is notified of the rejection at block 560. If an electronic message is generated at block 580, the electronic message is sent at block 570. Either the electronic message or the rejection of the request may be tracked by updating a history of all requests processed at block 590.

Referring now to FIG. 6 is a block diagram depicting an example computing system 610 for implementing certain embodiments.

The computing system 610 comprises a processor 611 that is communicatively coupled to a memory 602 and executes computer-executable program instructions and/or accesses information stored in the memory 602 or any other accessible computer-readable medium. The memory 602 can include any suitable computer-readable medium.

A message controller application 603 stored in memory 602 can configure the processor 611 to determine if electronic message 604 is legitimate (ham) or spam in accordance with the various embodiments described herein. To determine if electronic message 604 is legitimate or span, message controller application 603 can use templates 605 to generate the electronic message 604 from a request received. Additionally, message controller application 603 can access abuse policy 607 for configurable parameters and counters that aid in determining if electronic message 604 is legitimate or spam. Message controller application 603 can also keep a history of electronic messages processed by updating the history 606 with information about each electronic message 604. Note that electronic message 604, templates 605, history 606, and abuse policy 607 may be local to the message controller application 603 (i.e., stored in the same Memory 602) or may be kept remotely on another device in communication with computing system 610. In some embodiments, the message controller application 603 can be a software module included in or accessible by a separate application executed by the processor 611. In other embodiments, the message controller application 603 can be a stand-alone application executed by the processor 611. It is to be understood that message controller application 603 implements the functionality of a message controller: hence, "message controller application" and "message controller" are used interchangeably.

Abuse policy 607 may be configured and/or stored in the same computing system 610 which contains message controller application 603. However, the abuse policy 607 may also be configured and/or stored on a separate computing system to which the computing system 610 has remote access.

The processor 611 may comprise a microprocessor, an application-specific integrated circuit ("ASIC"), a state machine, or other processing device. The processor 611 can include or may be in communication with any other computer-readable medium storing instructions that, when executed by the processor 611, cause the processor to perform the functionality or steps described herein.

The computing system 610 may also comprise a number of external or internal devices such as input or output devices. For example, the computing system 610 is shown with an input/output ("I/O") interface 613, a display device 615, and any other user interface devices 614 such as a mouse. A bus 612 can also be included in the computing system 610. The bus 612 can communicatively couple one or more components of the computing system 610.

The computing system 610 can include any suitable computing device for executing the message controller application 603. Non-limiting examples of a computing device include a desktop computer, a tablet computer, a laptop computer, or any other computing device suitable for analyzing electronic message 604.

Embodiments of the methods disclosed herein may be performed in the operation of such computing devices. The order of the steps presented in the examples above can be varied—for example, steps can be re-ordered, combined, and/or broken into sub-steps. Certain steps or processes can be performed in parallel.

General

Certain embodiments relate to preventing spam in both local and distributed environments. The techniques and the other features described herein have uses in a variety of contexts, not to be limited by the specific illustrations provided herein. For example, although an electronic message through an email has been used for illustration, the invention may be extended to protecting online social networks from blog comment spam. In this example, the notification request would request the generation of a blog comment. Once the blog comment is generated by the message controller, it would be analyzed through the use of filters to determine if it is legitimate or spam. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

In addition, with respect to the computer implementations depicted in the Figures and described herein, certain details, known to those of skill in the art have been omitted. For example, software applications that execute on each of the devices and functions performed thereon are shown in the Figures as functional or storage components on the respective devices. As is known to one of skill in the art, such applications may be resident in any suitable computer-readable medium and execute on any suitable processor. For example, the devices each may comprise a computer-readable medium such as a random access memory (RAM), coupled to a processor that executes computer-executable program instructions stored in memory. Such processors may comprise a microprocessor, an ASIC, a state machine, or other processor, and can be any of a number of computer processors, Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

While a network may comprise the Internet, in other embodiments, other networks, such as an intranet, or no network may be used. Moreover, methods may operate within a single device. Devices can be connected to a network 210 as shown. Alternative configurations are of course possible. The devices may also comprise a number of external or internal devices such as a mouse, a CD-ROM, DVD, a keyboard, a display, or other input or output devices. Examples of devices are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media content consuming programs. The server devices may be single computer systems or may be implemented as a network of computers or processors. Examples of a server device are servers, mainframe computers, networked computers, a processor-based device, and similar types of systems and devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

That which is claimed is:

1. A computer implemented method for detecting spam in outbound electronic messages generated by web applications, comprising:

receiving, by a message controller from a web application, a request to generate an outgoing electronic message, the request comprising a template specifying a format of the electronic message and dynamic information identifying at least one of a sender, a recipient or message content, wherein the template comprises static message content and the dynamic information comprises a personalized message to the recipient, the personalized message defined in part by the web application and in part by a user of the web application;

determining, by the message controller, multiple score values for the dynamic information, wherein each respective score value of the multiple score values is associated with a respective portion of the dynamic information;

obtaining, by the message controller, an abuse score threshold associated with the web application requesting to generate the outgoing electronic message;

obtaining, by the message controller, multiple weights associated with the abuse score threshold, wherein each respective weight of the multiple weights is associated with a respective score value of the multiple score values;

determining, by the message controller, an abuse score for the dynamic information based at least in part on the multiple score values and the multiple weights;

in the event of a positive result of a comparison of the abuse score to the abuse score threshold:
  determining, by the message controller, that the dynamic information is legitimate dynamic information that is unlikely to generate spam if included in a message,
  generating, by the message controller, the outgoing electronic message using the template and the legitimate dynamic information such that the legitimate dynamic information replaces one or more corresponding template variables in accordance to the format of the template, and
  subsequently providing the generated outgoing electronic message to an email service provider for sending; and in the event of a negative result of the comparison of the abuse score to the abuse score threshold, rejecting, by the message controller, the request to generate the outgoing electronic message.

2. The method of claim 1, further comprising sending the web application requesting to generate the outgoing electronic message the multiple score values determined, in the event the request to generate the outgoing electronic message is rejected.

3. The method of claim 1, further comprising obtaining, by the message controller, an abuse policy associated with the web application requesting to generate the outgoing electronic message, wherein the abuse policy comprises the multiple respective weights used for determining each of the multiple respective score values.

4. The method of claim 3, wherein the abuse score is determined by the sum of the product of each of the multiple score values and the respective weights.

5. The method of claim 1, wherein the abuse score is determined in part by the sum of each of the multiple score values.

6. The method of claim 1, wherein the multiple score values comprise a daily source score, a rate source score, a daily destination score, a rate source score, a content score, and a blacklist score.

7. The method of claim 6, wherein the daily source score is a measure of the number of emails sent by the sender in a day, or wherein the rate source score is a measure of the rate which the sender sends emails in a predefined time period.

8. The method of claim 6, wherein the content score is a probability measuring the likelihood that the outgoing electronic message would be spam if the content is included in the outgoing electronic message.

9. The method of claim 8, wherein the content score is determined by Bayesian Content Filtering incorporating the content of the dynamic information that is generated by the sender.

10. The method of claim 1 further comprising:
  maintaining, by the message controller, counters to aid in determining at least one of the multiple score values; and
  synchronizing, by the message controller, the counters with corresponding counters that are simultaneously maintained by other servers performing the same method.

11. The method of claim 10 wherein the counters comprise a day-sent counter for the sender measuring the aggregate number of emails that are sent by the sender in a day, an average counter measuring the average number of emails that are sent by the sender in a day, and a minute-sent counter for the sender measuring the aggregate number of emails that are sent by the sender every minute.

12. The method of claim 10 wherein the counters comprise a day-sent counter for the recipient measuring the aggregate number of emails that are sent to the recipient in a day, an average counter measuring the average number of emails that are sent to the recipient in a day, and a minute-sent counter for the recipient measuring the aggregate number of emails that are sent to the recipient every minute.

13. A system for detecting spam in outbound electronic messages generated by web applications, comprising:
  a processor; and
  a non-transitory computer-readable medium comprising instructions, the instructions, when executed by the processor, causing the system to perform the steps comprising:
    receiving a request from a web application to generate an outgoing electronic message, the request comprising a template specifying a format of the outgoing electronic message and dynamic information identifying at least one of a sender, a recipient or message content, wherein the template comprises static message content and the dynamic information comprises a personalized message to the recipient, the personalized message defined in part by the web application and in part by a user of the web application;
    determining multiple score values for the dynamic information, wherein each respective score value of the multiple score values is associated with a respective portion of the dynamic information;
    obtaining an abuse score threshold associated with the web application requesting to generate the outgoing electronic message;
    obtaining multiple weights associated with the abuse score threshold, wherein each respective weight of the multiple weights is associated with a respective score value of the multiple score values;
    determining an abuse score for the dynamic information based at least in part on the multiple score values and the multiple weights;

in the event of a positive result of a comparison of the abuse score to the abuse score threshold:
determining that the dynamic information is legitimate dynamic information that is unlikely to generate spam if included in a message,
generating the outgoing electronic message using the template and the legitimate dynamic information such that the legitimate dynamic information replaces one or more corresponding template variables in accordance to the format of the template, and
subsequently providing the generated outgoing electronic message to an email service provider for sending; and
in the event of a negative result of the comparison of the abuse score to the abuse score threshold, rejecting the request to generate the outgoing electronic message.

14. The system of claim 13, further comprising the step of obtaining an abuse policy associated with the web application requesting to send the outgoing electronic message, the abuse policy comprises multiple respective weights for determining each of the multiple respective score values.

15. The system of claim 13, wherein the abuse score is determined in part by the sum of each of the multiple score values.

16. The system of claim 13, wherein the multiple score values comprise a daily source score, a rate source score, a daily destination score, a rate source score, a content score, and a blacklist score.

17. A non-transitory computer-readable medium on which is encoded program code for configuring a message controller for detecting spam in outbound electronic messages generated by web applications, the program code comprising:
program code for receiving a request from a web application to generate an outgoing electronic message, the request comprising a template specifying a format of the outgoing electronic message and dynamic information identifying at least one of a sender, recipient or message content, wherein the template comprises static message content and the dynamic information comprises a personalized message to the recipient, the personalized message defined in part by the web application and in part by a user of the web application;
program code for determining multiple score values for the dynamic information, wherein each respective score value of the multiple score values is associated with a respective portion of the dynamic information;
program code for obtaining an abuse score threshold associated with the web application requesting to generate the outgoing electronic message;
program code for obtaining multiple weights associated with the abuse score threshold, wherein each respective weight of the multiple weights is associated with a respective score value of the multiple score values;
program code for determining an abuse score for the dynamic information based at least in part on the multiple score values and the multiple weights; and
program code for:
in the event of a positive result of a comparison of the abuse score to the abuse score threshold, determining that the dynamic information is legitimate dynamic information that is unlikely to generate spam if included in a message, generating the outgoing electronic message using the template and the legitimate dynamic information such that the legitimate dynamic information replaces one or more corresponding template variables in accordance to the format of the template, and subsequently providing the generated outgoing electronic message to an email service provider for sending; and
in the event of a negative result of the comparison of the abuse score to the abuse score threshold, rejecting the request to generate the outgoing electronic message.

18. The non-transitory computer-readable medium of claim 17 further comprising program code for sending the web application requesting to the outgoing electronic message the multiple score values determined in the event the request to generate the outgoing electronic message is rejected.

19. The method of claim 1, wherein the request to generate the outgoing electronic message is received from the web application via an application programming interface (API) provided by the message controller, and wherein the outgoing electronic message is generated by a message composer included in the message controller.

20. The method of claim 1, wherein determining the multiple score values comprises automatically learning abuse scores for new dynamic information based on a train-on-error learning method.

* * * * *